(12) United States Patent
Smith

(10) Patent No.: US 7,886,338 B2
(45) Date of Patent: Feb. 8, 2011

(54) SYSTEM AND METHOD FOR CONTROLLING ACCESS TO LOCAL SERVICES WITHOUT LOSING FAILOVER CAPIBILTY

(75) Inventor: W. Eric Smith, Lindon, UT (US)

(73) Assignee: Control4 Corporation, Draper, UT (US)

( * ) Notice: Subject to any disclaimer, the term of this patent is extended or adjusted under 35 U.S.C. 154(b) by 740 days.

(21) Appl. No.: 11/869,638

(22) Filed: Oct. 9, 2007

(65) Prior Publication Data

US 2008/0091285 A1   Apr. 17, 2008

Related U.S. Application Data

(60) Provisional application No. 60/849,991, filed on Oct. 6, 2006.

(51) Int. Cl.
*H04L 9/32* (2006.01)
(52) U.S. Cl. .............................. 726/2; 726/3
(58) Field of Classification Search ............... 726/2–7, 726/11; 713/189, 193–194; 709/217–225, 709/228–229
See application file for complete search history.

(56) References Cited

U.S. PATENT DOCUMENTS

| | | | |
|---|---|---|---|
| 3,878,377 A | 4/1975 | Brunone | |
| 3,909,826 A | 9/1975 | Schildmeier et al. | |
| 4,040,060 A | 8/1977 | Kaloi | |
| 4,068,289 A | 1/1978 | Ferrigno | |
| 4,138,684 A | 2/1979 | Kerr | |
| 4,163,218 A | 7/1979 | Wu | |
| 4,186,381 A | 1/1980 | Fleischer et al. | |
| 4,222,564 A | 9/1980 | Allen et al. | |
| 4,322,842 A | 3/1982 | Martinez | |
| 4,334,171 A | 6/1982 | Parman et al. | |
| 4,393,277 A | 7/1983 | Besen et al. | |
| 4,418,333 A | 11/1983 | Schwarzbach et al. | |
| 4,511,887 A | 4/1985 | Fiore | |
| 4,524,288 A | 6/1985 | Schimmelpennink et al. | |
| 4,527,247 A | 7/1985 | Kaiser et al. | |
| 4,636,791 A | 1/1987 | Burke et al. | |
| 4,644,320 A | 2/1987 | Carr et al. | |
| 4,703,306 A | 10/1987 | Barrit | |

(Continued)

FOREIGN PATENT DOCUMENTS

EP   0 513 443   11/1992

(Continued)

OTHER PUBLICATIONS

Depositon of Bill Nuffer, CPP, Apr. 30, 2005, pp. 1-49.

*Primary Examiner*—Hosuk Song
(74) *Attorney, Agent, or Firm*—Thorpe North & Western LLP

(57) ABSTRACT

A system and method are provided for controlling access to local electronic devices in an automation network while maintaining failover capability. The method can include the operation of setting a state of a networked device to an online state. Another operation is sending a communication from the networked device to a controller requesting permission to change state of the networked device. The networked device may wait a predetermined amount of time to receive permission to change state. The state of the network device can change without permission from the controller after the predetermined amount of time has passed.

13 Claims, 3 Drawing Sheets

U.S. PATENT DOCUMENTS

| | | | |
|---|---|---|---|
| 4,706,274 A | 11/1987 | Baker et al. | |
| 4,755,792 A | 7/1988 | Pezzolo et al. | |
| 4,764,981 A | 8/1988 | Miyahara et al. | |
| 4,768,218 A | 8/1988 | Yorita | |
| 4,823,069 A | 4/1989 | Callahan et al. | |
| 4,825,209 A | 4/1989 | Sasaki et al. | |
| 4,829,554 A | 5/1989 | Barnes et al. | |
| 4,864,588 A | 9/1989 | Simpson et al. | |
| 4,873,711 A | 10/1989 | Roberts et al. | |
| 4,881,259 A | 11/1989 | Scordato | |
| 4,889,999 A | 12/1989 | Rowen | |
| 4,896,370 A | 1/1990 | Kasparian et al. | |
| 4,908,604 A | 3/1990 | Jacob | |
| 4,918,432 A | 4/1990 | Pauley et al. | |
| 4,918,717 A | 4/1990 | Bissonnette et al. | |
| 4,928,778 A | 5/1990 | Tin | |
| 4,939,792 A | 7/1990 | Urbish et al. | |
| 4,940,964 A | 7/1990 | Dao | |
| 4,977,529 A | 12/1990 | Gregg et al. | |
| 4,996,703 A | 2/1991 | Gray | |
| 5,017,837 A | 5/1991 | Hanna et al. | |
| 5,051,720 A | 9/1991 | Kittirutsunetorn | |
| 5,079,559 A | 1/1992 | Umetsu et al. | |
| 5,086,385 A | 2/1992 | Launey et al. | |
| 5,089,974 A | 2/1992 | Demeyer et al. | |
| 5,099,193 A | 3/1992 | Moseley et al. | |
| 5,109,222 A | 4/1992 | Welty | |
| 5,146,153 A | 9/1992 | Luchaco et al. | |
| 5,173,855 A | 12/1992 | Nielsen et al. | |
| 5,191,265 A | 3/1993 | D'Aleo et al. | |
| 5,218,344 A | 6/1993 | Ricketts | |
| 5,218,628 A | 6/1993 | Ito | |
| 5,224,648 A | 7/1993 | Simon et al. | |
| 5,237,264 A | 8/1993 | Moseley et al. | |
| 5,321,736 A | 6/1994 | Beasley | |
| 5,348,078 A | 9/1994 | Dushane et al. | |
| 5,359,625 A | 10/1994 | Vander Mey et al. | |
| 5,382,947 A | 1/1995 | Thaler et al. | |
| 5,386,209 A | 1/1995 | Thomas | |
| 5,400,041 A | 3/1995 | Strickland | |
| 5,400,246 A | 3/1995 | Wilson et al. | |
| 5,426,439 A | 6/1995 | Grossman | |
| 5,455,464 A | 10/1995 | Gosling | |
| 5,495,406 A | 2/1996 | Kushiro et al. | |
| 5,530,322 A | 6/1996 | Ference et al. | |
| 5,544,036 A | 8/1996 | Brown, Jr. et al. | |
| 5,565,855 A | 10/1996 | Knibbe | |
| 5,570,085 A | 10/1996 | Bertsch | |
| 5,572,438 A | 11/1996 | Ehlers et al. | |
| 5,574,748 A | 11/1996 | Vander Mey et al. | |
| 5,598,039 A | 1/1997 | Weber | |
| 5,736,965 A | 4/1998 | Mosebrook et al. | |
| 5,793,300 A | 8/1998 | Suman et al. | |
| 5,798,581 A | 8/1998 | Keagy et al. | |
| 5,889,935 A * | 3/1999 | Ofek et al. | 714/6 |
| 5,905,442 A | 5/1999 | Mosebrook et al. | |
| 5,982,103 A | 11/1999 | Mosebrook et al. | |
| 6,687,487 B1 | 2/2004 | Mosebrook et al. | |
| 6,803,728 B2 | 10/2004 | Balasubramaniam | |
| 2007/0255861 A1* | 11/2007 | Kain et al. | 710/8 |

FOREIGN PATENT DOCUMENTS

EP    0 513 688    11/1992

* cited by examiner

SYSTEM AND METHOD FOR CONTROLLING ACCESS TO LOCAL SERVICES WITHOUT LOSING FAILOVER CAPIBILTY

CLAIM OF PRIORITY

Priority of U.S. Provisional patent application Ser. No. 60/849,991 filed on Oct. 6, 2006 is claimed.

FIELD OF THE INVENTION

The present invention relates generally to control of electronic devices.

BACKGROUND

The price of electronic devices has continued to decrease dramatically. In addition, the variety of consumer electronic components and home automation electronics that can be purchased has continued to increase. Examples of home automation electronics that are available include: remotely controlled light switches and dimmers, wireless networks, wireless power controls, wireless switches, remote controlled fireplaces, garage doors and even appliances. The decrease in prices and increased availability has made home audio, home video, and home automation electronics more available to end users.

The availability of home automation devices, large screen TVs, surround sound stereo equipment, DVDs, CDs, MP3s and similar electronic equipment has also increased consumer interest in networking such devices together. It has become easier and less expensive to buy many networkable devices that can be used to control lighting, monitor appliances, provide high quality movies, music, broadcast television, satellite programs, cable programs, Internet connections, and other electronic components for a home automation network.

Accordingly, there are controller systems and/or switching systems that enable consumer electronics and automatable devices to be connected into a controller. The switching and routing of signals between multiple networked devices can be controlled through that controller. Users who are able to connect all of their components to such a controller or receiver have the benefit of being able to easily switch back and forth between video feeds, control lights and doors, obtain audio streams, control other home automation devices, and provide routing of signals between their electronic components.

Many home automation devices and other systems can be networked into a central controller through a wired or wireless network. Examples of electronic components that an individual may desire to couple to the controller can include: television screens, computer monitors, video projection systems, CD players, DVD players, VCRs, audio equipment, surround sound stereo equipment, video cameras, microphones and other audio-visual and entertainment equipment. In addition, other home and business equipment can be connected to the central controller such as: USB devices, FireWire devices, serial and parallel connections, fiber optic connections, a computer network using an Ethernet or wireless connection, Internet connections. Other types of devices that can be routed into the controller can include home automation equipment such as: lighting control switches, fireplace relays, dimmers, thermostats, HVAC, timers, alarm systems and other types of home automation equipment which can be connected into the controller. While the term home automation is used herein, these electronic components that have been described can be used with the central controller in other settings, including business, education, government, hotels, churches, broadcasting and entertainment facilities.

DETAILED DESCRIPTION

Figure 1:
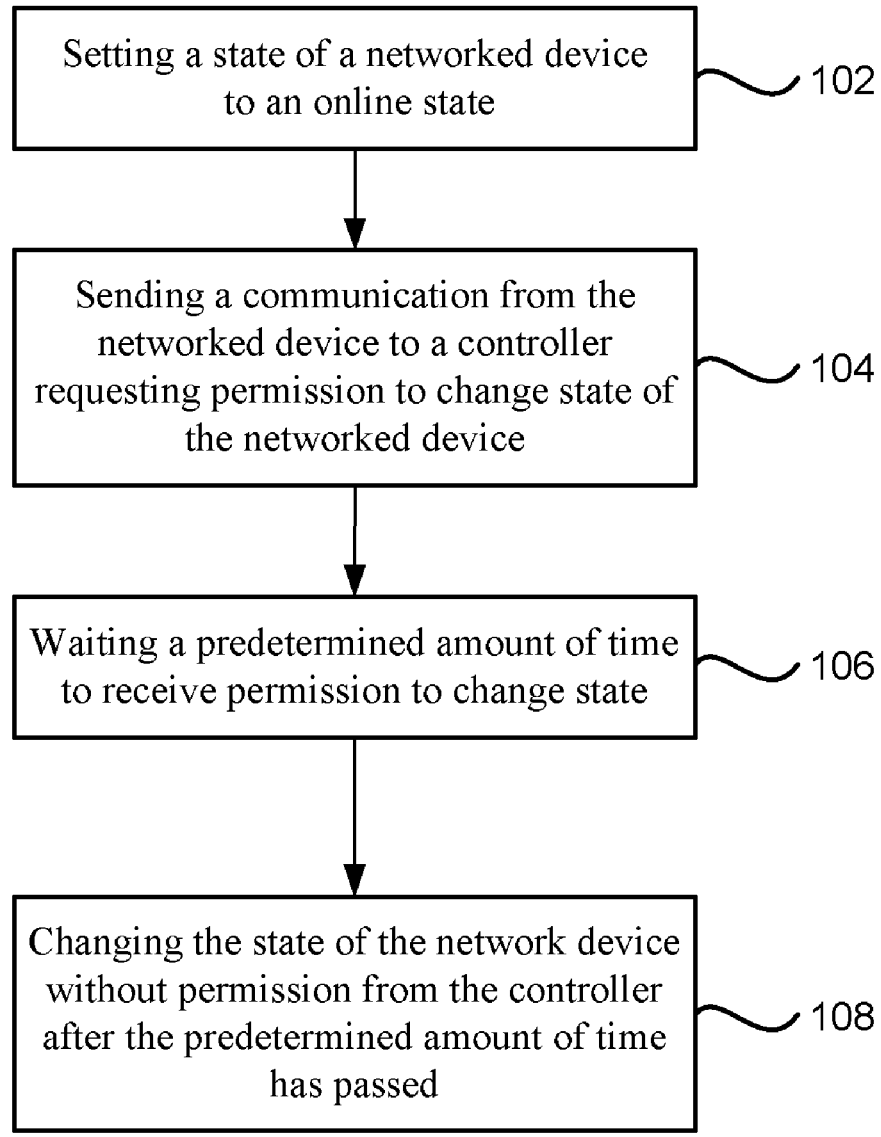
FIG. 1 is a flowchart illustrating an embodiment of a method of controlling access to local electronic devices in an automation network while maintaining failover capability.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

There are occasions in an automated building or home where the user wants to restrict access to different services that are provided through automated, networked devices. An example of this type of automated service would be lighting. It is well known that most people fall asleep more easily in a darkened room. Many times parents want to make sure that their kids do not turn on the lights to play or read at night because the children need to sleep.

One approach to solving this problem in an automation system can be to have all of the light switches report their state to the automation controller whenever there is a state change. In this scenario, the controller can just tell the light to turn back off immediately. In most cases this approach would be sufficient, but many times the user wants to ensure that the service is not available at all (e.g. the light doesn't turn on even for a second). This system and method can deliver this kind of control.

For the purpose of providing a clear example, this discussion will refer to the lighting scenario described above, but the control system can easily be extended to additional services like controlling TV time, access to music, control of HVAC (heating and air conditioning) systems, or any automated devices that can be connected into a communication network. Most smart light switches change state (i.e. turn on or off, dim to a level etc.) immediately when the local button is pressed. In one embodiment, the device would only behave this way when in an "offline" state.

Typically, the device would be in an "online" state meaning it is in communications with the controller. In the "online" state, the device can send a communications packet to the controller asking for permission to change state, and the networked device is configured to perform that state change after being given permission by the controller. In this approach, the controller can even track the state of the light without the light switch needing to send state information by simply tracking the requests that were allowed.

One result of the approach described above is that if the device loses communications with the controller, it becomes impossible to turn on the light. There are many reasons why the controller might not be able to respond to requests. These include controller failure, power outage, interference, etc.

As a result, the present system and method can employ a timeout on requests where if the controller does not respond to a request in a predetermined amount of time, the light can revert to "offline" mode and just make the change without waiting any longer for permission. This does introduce the problem that the controller may track an incorrect state for a short period when there is a system problem, but the controller is able to re-gain the knowledge of the networked device's state when the device comes back "online" after the next state change request. Re-capturing the state of the device may take only a fraction of a second or several seconds where the malfunction is more serious. This approach also takes away the access restrictions or controls for services when the communication link fails, so this approach is most effectively used in scenarios where the communication rarely fails or where the negative consequences of failure are minimal (like the lighting example). In other words, this system and method can be more effective when the control over access to networked devices is not critical.

FIG. 1 is a flowchart illustrating an embodiment of a method of controlling access to local electronic devices in an automation network while maintaining failover capability. The method can include the operation of setting a state of a networked device to an online state, as in block 102. In other words, when the networked device or automation device is in an online state it is configured to request permission from the controller to change state.

Another operation is sending a communication from the networked device to a controller requesting permission to change state of the networked device, as in block 104. The networked device may wait a predetermined amount of time to receive permission from the controller to change state, as in block 106. The state of the network device can change without permission from the controller after the predetermined amount of time has passed, as in block 108. In other words, if a response has not been received from the controller within a defined time frame then the networked device will timeout and change its state to the desired state.

Figure 2:
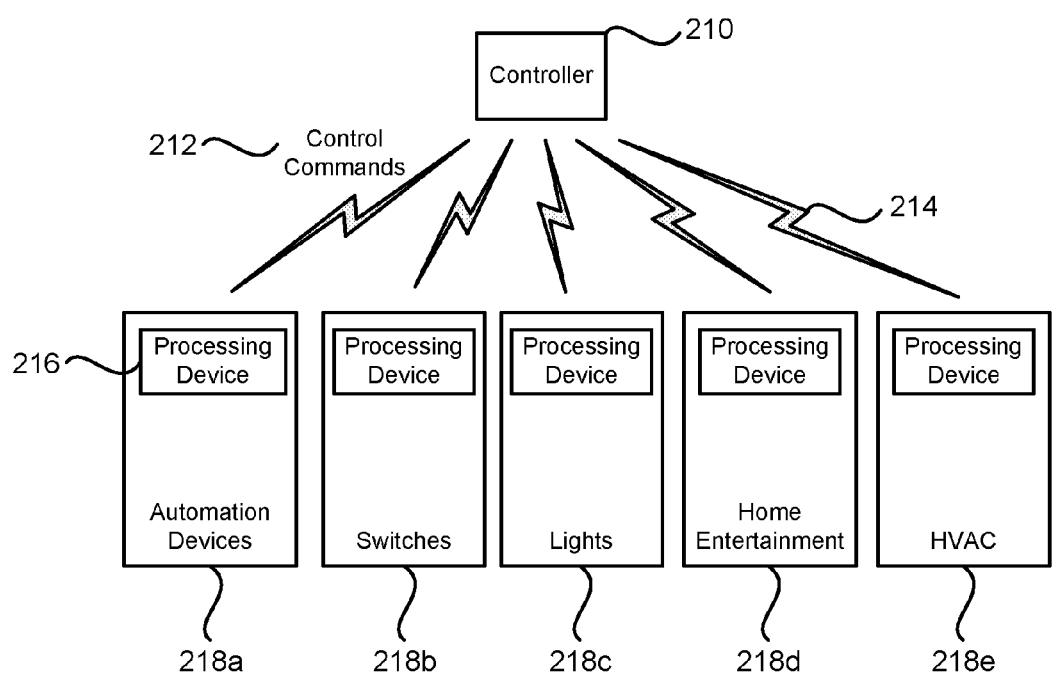
FIG. 2 is a block diagram illustrating a system for controlling access to local electronic devices in a wireless automation network while maintaining failover capability.

FIG. 2 illustrates a system for controlling access to local electronic devices in an automation network while maintaining failover capability. The system can include networked devices 218a-e that are set to an online state. The networked devices can be automation devices such as: light switches, power switches, home entertainment devices, heating ventilation and air conditioning (HVAC) controllers, garage door openers, door monitors, DVD players, televisions, personal computers, audio equipment, and other automated devices that can be controlled over a network.

A controller 210 or central processor can be configured to receive communications from a networked device requesting permission to change state of a networked device. For example, a light switch can send a communication to the controller making a request to turn a light from "off" to "on" because its physical switch has been changed by a person. In addition, the controller may be generally defined as an electronic system that may include device automation control systems, receiver functions for audio and video, a central processor and user interface, networking controllers, and other automation and media functions.

A communication network can be provided to transport communications or control commands 212 between the networked devices 218a-e and the controller 210. The communications network can be a wireless network 214 as illustrated in FIG. 2. For example, the wireless network and protocols may use the Zigbee (IEEE 815.15.4) standard to form ad-hoc networks, also referred to as mesh networks. Mesh networks use a plurality of nodes, with each node being able to communicate to other neighboring nodes that are within range. Thus, each node can act as a repeater. This allows wireless systems employing mesh networks to use inexpensive, lower power transceivers since each node only needs to broadcast as far as a neighboring node, which can then pass the data on to another node until the data reaches a controller or other destination connected to a wired system. Other wireless protocols that can be used are the IEEE 802.11 standard, the Bluetooth standard, or other networking communications protocols but these protocols may be less effective in some situations.

Figure 3:
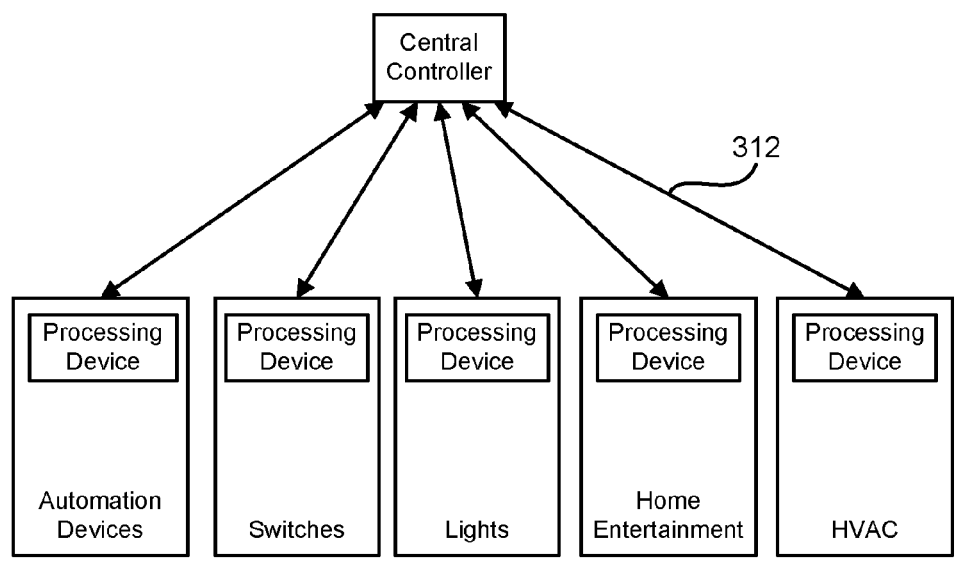
FIG. 3 is a block diagram illustrating a system for controlling access to local electronic devices in a wired automation network while maintaining failover capability.

Alternatively, the communications network can be a physically wired network 312 as illustrated in FIG. 3. For example, the wired network can be connected together using Ethernet and twisted pair or coaxial cable wiring. Another example may be use of fiber optic network connections. Of course, other physical wiring connection schemes and their associated protocols can be used.

Referring again to FIG. 2, a processing device 216 can be contained in the networked device and the processing device can be configured to wait a predetermined amount of time to receive permission from the controller to change state. If the network device does not receive a response from the central controller after the predetermined amount of time has passed, then the network device can change state without permission from the controller. The pre-determined amount of time can be set by measuring the maximum amount of time that it is expected to take the controller to respond. That maximum expected response time may be set as the threshold amount of time or the threshold can be set as a multiple of the maximum amount of expected time for response.

The processing device can be an integrated circuit (IC) chip that has a processor and a clock on the chip to time how long it takes for messages to get back to the networked device from the controller. Alternatively, the processing device can be just a timing module. Other circuits that use discrete electronic components may also be used to measure the time it takes for a message to come back.

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth herein.

The invention claimed is:

1. A method of controlling access to electronic devices in an automation network while maintaining failover capability, comprising:
   setting a state of a networked device to an online state;
   configuring the networked device to request permission from a controller to change state;
   sending a communication from the networked device to the controller requesting permission to change state of the networked device;
   waiting a predetermined amount of time to receive permission to change state; and changing the state of the networked device without permission from the controller after the predetermined amount of time has passed.

2. The method as in claim 1, wherein the step of changing the state of the networked device further comprises the step of changing the state of the networked device to an offline state.

3. The method as in claim 1, wherein the predetermined amount of time is a timeout.

4. The method as in claim 1, further comprising the step of tracking the state of the networked device by tracking requests that were allowed by the controller.

5. A system for controlling access to local electronic devices in an automation network while maintaining failover capability, comprising:
   a networked device that is set to an online state;
   a controller configured to receive communications from the networked device requesting permission to change state of the networked device;
   a communication network that is configured to transport communications between the networked device and the controller; and
   a processing device in the networked device configured to wait a predetermined amount of time to receive permission to change state, wherein the processing device includes a clock to time a waiting period for receiving permission from the controller and the networked device will change state without permission from the controller after the predetermined amount of time has passed.

6. The system as in claim 5, wherein the communication network is a wireless communication network.

7. The system as in claim 5, wherein the communication network is a wired communication network.

8. The system as in claim 5, wherein the controller can track the state of the networked device by tracking requests that were allowed by the controller.

9. A method of controlling access to a networked device in an automation network while maintaining failover capability, comprising:
   setting a state of a networked device to an online state;
   configuring the networked device to request permission from a controller to change state;
   sending a communication from the networked device to the controller requesting permission to change state of the networked device;
   waiting a predetermined amount of time to receive permission to change state;
   changing the state of the networked device without permission from the controller after the predetermined amount of time has passed and no response has been received from the controller; and
   setting the state of the networked device to an offline state.

10. The method as in claim 9, wherein the predetermined amount of time is a timeout period.

11. The method as in claim 9, further comprising the step of tracking the state of the networked device by tracking requests that were allowed by the controller.

12. A system for controlling access to electronic devices in an automation network while maintaining failover capability, comprising:
   an automation device that is set to an online state;
   a controller configured to receive communications from a networked device requesting permission to change state of the networked device;
   a communication network that is configured to transport communications between the networked device and the controller; and
   a timing module in the networked device configured to wait a predetermined amount of time to receive permission to change state, wherein the timing module includes a clock to time a waiting period for receiving permission from the controller and the networked device will change state without permission from the controller after the predetermined amount of time has passed.

13. The system as in claim 12, wherein the controller can track the state of the networked device by tracking requests that were allowed by the controller.

* * * * *